(12) United States Patent
Mahalingam et al.

(10) Patent No.: US 8,028,071 B1
(45) Date of Patent: Sep. 27, 2011

(54) TCP/IP OFFLOAD ENGINE VIRTUALIZATION SYSTEM AND METHODS

(75) Inventors: Mallik Mahalingam, Sunnyvale, CA (US); Ramu Arunachalam, Petaluma, CA (US); Walter Andrew Lambeth, San Mateo, CA (US)

(73) Assignee: VMware, Inc., Palo Alto, CA (US)

( * ) Notice: Subject to any disclaimer, the term of this patent is extended or adjusted under 35 U.S.C. 154(b) by 835 days.

(21) Appl. No.: 11/705,842

(22) Filed: Feb. 14, 2007

Related U.S. Application Data

(60) Provisional application No. 60/773,895, filed on Feb. 15, 2006.

(51) Int. Cl.
*G06F 15/16* (2006.01)
*G06F 9/455* (2006.01)
*H04L 12/28* (2006.01)

(52) U.S. Cl. ............................. 709/227; 370/254; 718/1
(58) Field of Classification Search .............. 709/1, 239, 709/250, 228, 227; 718/1; 370/254, 389
See application file for complete search history.

(56) References Cited

U.S. PATENT DOCUMENTS

| | | | | |
|---|---|---|---|---|
| 6,496,847 B1 * | 12/2002 | Bugnion et al. | ................... | 718/1 |
| 6,795,966 B1 * | 9/2004 | Lim et al. | ........................... | 718/1 |
| 6,944,699 B1 * | 9/2005 | Bugnion et al. | .............. | 710/269 |
| 7,020,532 B2 * | 3/2006 | Johnson et al. | .................. | 700/89 |
| 7,111,303 B2 * | 9/2006 | Macchiano et al. | .......... | 719/313 |
| 7,272,831 B2 * | 9/2007 | Cota-Robles et al. | ............. | 718/1 |
| 7,424,710 B1 * | 9/2008 | Nelson et al. | ....................... | 718/1 |
| 2002/0143842 A1 * | 10/2002 | Cota-Robles et al. | ............ | 709/1 |
| 2003/0037178 A1 * | 2/2003 | Vessey et al. | .................. | 709/319 |
| 2004/0015966 A1 * | 1/2004 | MacChiano et al. | .............. | 718/1 |
| 2004/0249957 A1 * | 12/2004 | Ekis et al. | ...................... | 709/228 |
| 2005/0060704 A1 * | 3/2005 | Bulson et al. | ...................... | 718/1 |
| 2005/0135361 A1 * | 6/2005 | Lim et al. | ....................... | 370/389 |
| 2006/0206904 A1 * | 9/2006 | Watkins et al. | ................ | 719/321 |
| 2006/0209718 A1 * | 9/2006 | Kinsey et al. | .................. | 370/254 |
| 2006/0212146 A1 * | 9/2006 | Johnson et al. | .................. | 700/89 |
| 2006/0242634 A1 * | 10/2006 | Fleischer et al. | .............. | 717/148 |
| 2007/0198720 A1 * | 8/2007 | Rucker | ........................... | 709/226 |
| 2007/0226386 A1 * | 9/2007 | Sharp et al. | ..................... | 710/62 |

* cited by examiner

*Primary Examiner* — Firmin Backer
*Assistant Examiner* — Michael A Chambers
(74) *Attorney, Agent, or Firm* — Darryl A. Smith

(57) ABSTRACT

A virtual computer system enabling dynamic, aggregated use of multiple TCP/IP offload engines (TOEs) by the set of guest computer systems hosted on the virtual computer system. Each of the guest computer systems includes an offload selection switch and the associated virtual machine monitor includes a first virtual context component. Second virtual context components are associated with a set of TCP/IP stacks and TOEs and interoperate with the first virtual context components to establish a virtual routing of network connections between the offload selection switches and the TOEs. The virtual context mapping retains the initially requested network connection information as well as the resolved virtual network connection established, thereby allowing the initial network connection request to be internally reapplied as required to accommodate dynamic changes in the network protocol parameters of the TOEs.

21 Claims, 5 Drawing Sheets

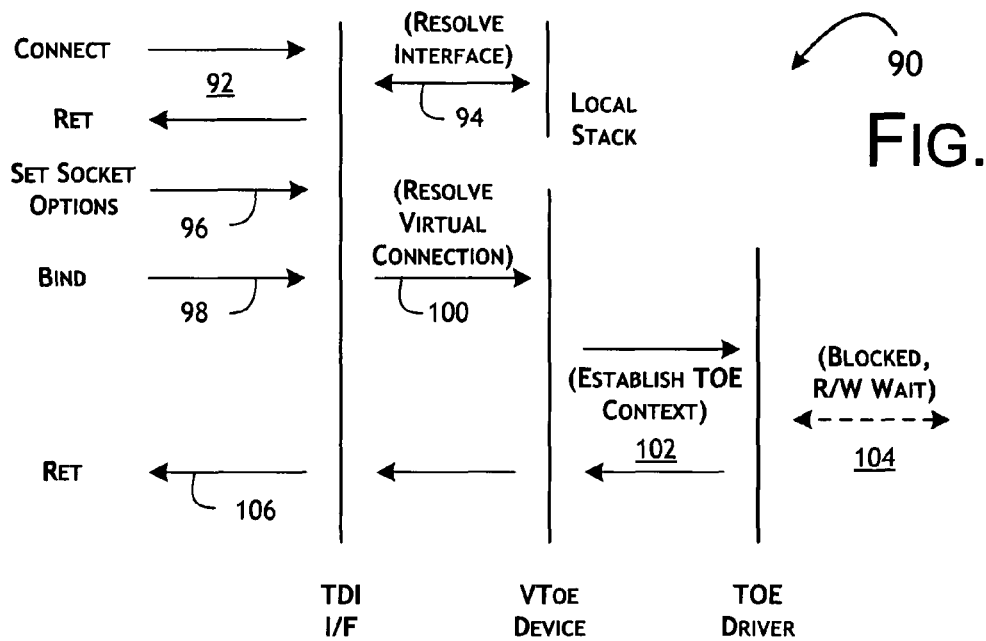
FIG. 3
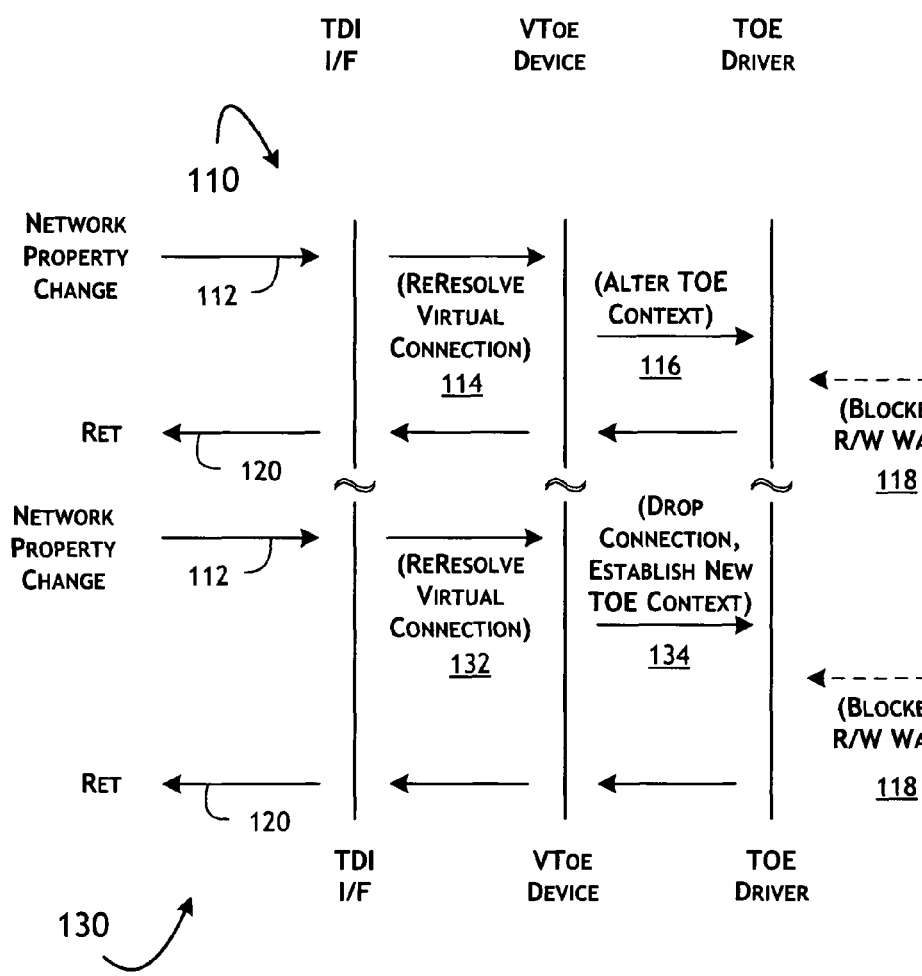
FIG. 4A
FIG. 4B

TCP/IP OFFLOAD ENGINE VIRTUALIZATION SYSTEM AND METHODS

CROSS-REFERENCE TO RELATED APPLICATION(S)

This application claims the benefit under 35 U.S.C. Section 119(e) of U.S. Provisional Application Ser. No. 60/773,895, filed on 15 Feb. 2006, to Mahalingam et al., entitled "TCP/IP Offload Engine Virtualization System And Methods," which is incorporated herein in its entirety.

BACKGROUND OF THE INVENTION

1. Field of the Invention

The present invention is generally related to networked virtual computer systems and in particular to an architecture and methods of providing TCP/IP offload engine support in virtual computer systems.

2. Description of the Related Art

Virtual computer systems are conventionally recognized as providing a variety of practical benefits, including more efficient use of hardware resources, improved opportunity for security and management control over executing applications, and the ability to support multiple discrete if not wholly independent execution environments. Consequently, interest in the architectural development of virtual computer systems, particularly in the areas of supporting new, performance-enhancing hardware, and extending those performance enhancements to the individual execution environments, is substantial and ongoing.

In summary, virtual computer systems are typically based on a conventional hardware platform providing one or more central processing units, a main memory, various persistent storage devices, and one or more network interface controllers (NICs), potentially of different design and functional capabilities. The hardware platform is used to support execution of a typically dedicated operating system kernel that, in turn, implements various virtualization drivers and services that enable multiple virtualization environments to be executed under the control of the virtualization kernel. A conventional host computer operating system can, in the alternative, be employed in place of the dedicated operating system kernel.

The virtualization environments supported by the kernel may be fully isolated execution spaces that, in turn, each encapsulate a network operating system instance and application program execution space. Each virtualization environment represents a discrete virtual machine (VM), and, as such, is often referred to as a guest computer system. Applications executed by the guest computer systems and their respective included guest operating systems are presented with the appearance and, in select circumstances, the fact of directly executing on the hardware platform. While vendors provide operating system drivers for the different, assembled components of the hardware platform, these drivers typically do not incorporate specific support for, or are capable of handling the complications arising from, potentially concurrent use by applications executing in multiple, independent virtualization environments. Therefore, the virtualization kernel is responsible for and generally implements the controls for coordinating access to the shared resources of the underlying hardware platform.

TCP/IP offload engines (TOEs) have been developed to improve the network access performance of computer systems in general. As the supported Ethernet network transmission speeds have increased to 1 Gbps and beyond, execution of the TCP/IP stack purely as a software component can impose a significant burden on the main central processing unit and restrict the actual network data throughput obtainable. TOEs typically implement a hardware TCP/IP protocol stack in combination with a hardware NIC as a platform pluggable hardware adapter. Recent generations of TOEs are nominally capable of supporting session establishment and a significant degree of error-handling services independent of the main central processing unit. Characteristically, however, TOE implementations must rely on a standard software TCP/IP stack, as implemented in a conventional operating system, as a fall-back to handle operating conditions—specifically complex protocol and error conditions—that are otherwise beyond the nominal capabilities of the particular TOE hardware implementation.

A variety of TOE-to-software TCP/IP stack interfaces are known to exist. In most cases, TOE vendors provide proprietary drivers and operating system service modules that will enable a specific TOE adapter to be utilized by a conventional, network-capable operating system, as typified by the major Linux® and Microsoft® operating system variants. Additionally, Microsoft has proposed a defined API, code-named Chimney, to support and define the fall-back coupling between a TOE and operating system kernel-based software TCP/IP stack. See, *Scalable Networking: Network Protocol Offload—Introducing TCP Chimney*, www.microsoft.com/whdc/device/network/TCP_Chimney. In all, the TOE drivers and service modules enable common network connections and data flows to be conducted through the TOE between an offload target, typically the TOE embedded NIC, and a transport driver, socket, or equivalent layer interface. Where the connection setup and data transport are without exception, utilization of the main central processing unit is minimal. Whenever a unhandleable TOE exception occurs, a protocol object representing the state of the connection and any in-transit data is transferred from the TOE hardware to a corresponding layer level within the associated software TCP/IP stack. This effectively transfers the exception condition to the full software stack for handling and recovery.

Conventional TOE driver and associated service module support is difficult in the context of virtual computer systems. While the more recent TOE implementations are capable of independently handling a wide range of protocol conditions and exceptions, the TOE functions must still be closely coordinated with and backed by a full capability software-based network stack. While the individual guest computer systems typically implement a full network stack as part of the guest operating system, there are practical performance constraints that limit use of these stacks in support of TOE implementations. "TCP/IP Offloading for Virtual Machines," U.S. patent application Ser. No. 10/741,244, which is assigned to the assignee of the present application and hereby expressly incorporated by reference, describes an effective approach to supporting TOE adapters in a virtual computer system. There, each TOE implementation provided as part of the hardware platform is supported by a virtualization kernel-based network stack. In turn, each guest computer system implements a guest network stack bypass that enables direct communications with an assigned TOE implementation and virtual kernel stack. A common socket connection space is defined for the guest stack, assigned virtualization kernel stack and TOE implementation to establish and ensure the path integrity of network session connections. This defined relation is effectively required by the fact that a conventional TOE implementation cannot multiplex between the separate socket spaces that would need to be presented to different guest computer systems.

Although fully functional, the system described in "TCP/IP Offloading for Virtual Machines" may not make optimum use of the TOE adapters provided as part of the hardware platform, particularly subject to dynamically changing operating conditions. Some guest computer systems may require only a fraction of the bandwidth provided by an assigned TOE implementation while others would be best served in a virtualization environment that supports dynamic aggregation of multiple TOE implementations. Consequently, there is a need for a TOE virtualization system and methods of integrating one or more TOE adapters into a virtual computer system that enables concurrent use of TOE implementations by multiple guest computer systems and, further, adaptability for dynamically changing operating conditions.

SUMMARY OF THE INVENTION

Thus, a general purpose of the present invention is to provide an efficient mechanism for enabling dynamic, aggregate use of multiple TCP/IP offload engines (TOEs) among multiple virtual machines within virtual computer system architectures.

This is achieved in the present invention by providing a virtual computer system employing one or more TOEs for use by guest computer systems hosted on a virtual computer system. Each of the guest computer systems is provided with an offload selection switch. An associated virtual machine monitor includes a first virtual context component. Second virtual context components are associated with the TOEs and further associated virtual kernel-based TCP/IP stacks. The first virtual context components interoperate with the first virtual context components to establish a virtual routing of network connections between the offload selection switches and the TOEs. The virtual context mapping retains the initially requested network connection information as well as the resolved virtual network connection established, thereby allowing the initial network connection request to be internally reapplied as required to accommodate dynamic changes in the network protocol parameters of the TOEs.

An advantage of the present invention is that the guest computer systems have virtualized access to any and all of the TOEs provided as part of the hardware platform. Bandwidth requirements and hardware utilization as between the guest computer systems can be readily optimized.

Another advantage of the present invention is that the TOE virtualization provided by the present invention reduces the software virtualization overhead otherwise incurred in the execution of the virtual machines. With network virtualization implemented in the virtual machines, the TOE hardware is leveraged to implement most layer two processing and packet routing.

A further advantage of the present invention is that the virtualization of the TOEs is fully compliant with the standard network interfaces used by conventional application programs. Guest computer system-executed applications and their guest operating systems are able to transparently utilize the full available set of hardware platform TOEs. Required system administration to enable use of the TOEs by the individual guest computer systems is minimal.

Still another advantage of the present invention is that the virtualization of the TOEs fully accommodates point-to-point, broadcast and listener network sessions. All standard socket configurations and uses are supported. In support of TOE virtualization, the present invention further enables dynamic reconfiguration of the internal virtual connections between the guest computer systems and TOEs in response to, for example, dynamic IP changes. The parameters used in initially requesting the establishment of a network session are recorded as provided to allow reevaluation in response to dynamic changes to the networking protocol parameters assigned to the TOEs. The sessions request parameters may also be persistently stored to enable support for suspended and moved guest computer systems.

BRIEF DESCRIPTION OF THE DRAWINGS

FIG. 3 is a state diagram describing the process of establishing a network session by a preferred embodiment of the present invention;

FIGS. 4A and 4B provide state diagrams that illustrate an alternate process of dynamically re-establishing connection properties when network properties applicable to a virtual machine have changed, as implemented in a preferred embodiment of the present invention;

DETAILED DESCRIPTION

In enabling the virtualization of TOE adapters for use in a virtual computer system, the present invention fundamentally enables any guest computer system to access and fully utilize any TOE adapter incorporated as part of the virtual computer system. This is accomplished through a complete virtualization of the set of TOE adapters made available to the guest computer systems, whereby the TOE adapters are functionally marshaled as a single aggregated resource available to each of the guest computer systems. Furthermore, this virtualization of the TOE adapters is implemented while maintaining conformance with the standard network APIs implemented by conventional application programs' network operating systems.

The virtualization of TOE adapters provided by the present invention is essentially independent of the detailed implementation of the TOE adapters, which may vary in multiple ways. Different conventional TOE adapter implementations will support varying degrees of TCP/IP offload functionality and can require different degrees of support by an associated software-based network stack. The TOE adapters and associated vendor-supplied TOE drivers and can integrate in different ways with the associated software-based network stack and preferentially operate through any of the conventional network APIs, including the Transport Driver Interface (TDI) and the various interfaces provided by Microsoft Chimney, Windows Sockets Direct, and standard Winsock drivers. Additionally, physical TOE adapters may and often will host multiple TOE cores that logically operate as parallel arrays of single TOE adapters. For purposes of this description, an unqualified reference to a TOE adapter will refer to a single logical adapter as viewed by the virtual computer system. Thus, while the invention will be described with specific reference to single TOE adapters and the TDI interface, it should be understood that the breadth of the present invention includes the various alternatives outlined above.

Figure 1:
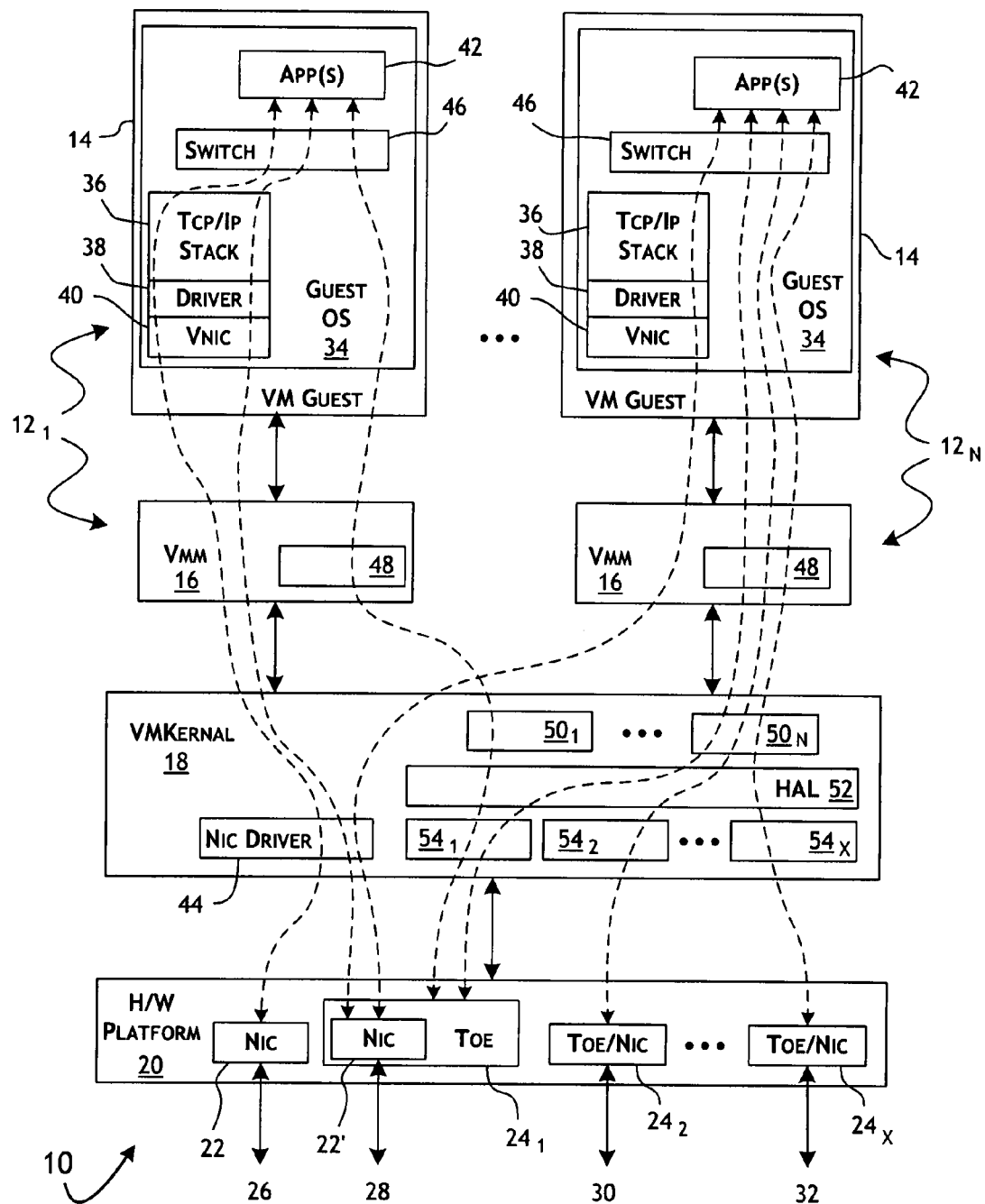
FIG. 1 provides an overview of a virtual computer system implementing a preferred embodiment of the present invention.

Referring now to FIG. 1, the architecture of a virtual computer system 10 incorporating the present invention is shown. The virtual computer system 10 hosts any number of guest computer systems $12_{1-N}$, each nominally including a virtual machine (VM) 14 and an associated interface software layer or component such as a virtual machine monitor (VMM) 16, which, in some literature or implementations, is referred to as, or as part of, a "hypervisor." In the preferred embodiment of the present invention, the guest computer systems $12_{1-N}$ are hosted by a virtual machine kernel (VMKernel) 18 on a conventional hardware platform 20, including central processing, memory, and persistent storage units (not shown). The platform 20 also may include any number of conventional network interface controllers (NICs) 22 and TOE adapters $24_{1-X}$. Characteristically, functionally conventional NICs 22' are incorporated as embedded components of the TOE adapters $24_{1-X}$. These embedded NICs 22' can appear as conventional NICs 22 to the VMKernel 18 while simultaneously supporting the hardware TCP/IP stack implemented by the embedding TOE adapter $24_{1-X}$. In each case, the NICs 22, 22' ultimately serve as the connection interface to conventional communications networks 26, 28, 30, 32.

In the preferred embodiments of the present invention, each of the virtual machines 14 hosts a guest operating system 34 including a local network stack 36, NIC driver 38 and virtual NIC 40. Application programs 42 executed within the user space of the guest operating system 34 as well as components of the guest operating system 34 nominally utilize the stack 36 to establish network communications sessions. The virtual NIC 40 operates to establish a data packet transfer path to and through a NIC driver module 44 loaded within the VMKernel 18 to the NIC 22.

A virtual TOE switch 46 is implemented in each of the virtual machines $12_{1-N}$, preferably in the form of a network component attached to the stack 36 using a standard interface. In a preferred embodiment of the present invention, the virtual TOE switch 46 is implemented as a network driver at the level of the TDI interface to allow evaluation and selective diversion of socket calls and related data transfer operations. Each call received through the TDI interface to create a socket is evaluated based on the provided socket number, the port number, and the identity of the requesting application or operating system component to determine whether the network session will be established through the stack 36 or routed through a virtual path to a TOE adapter $24_{1-X}$ connected to an appropriate network 26, 28, 30, 32. The criteria for diversion can be established administratively in the form of conventional network properties associated with the stack 36. The criteria can be specified differently for different guest computer systems $12_{1-N}$. Thus, the switch 46 operates to logically divide the socket space presented to the applications 42 and operating system 34 between un-accelerated NIC network connections and TOE accelerated network connections.

For diverted socket creation requests, a network session will be established utilizing a virtual path connection from the switch 46 initially through a virtual TOE device implemented in part in the virtual machine monitor 16 as a virtual context component 48, in accordance with a preferred embodiment of the present invention. The virtual context component 48 is responsible for maintaining the appearance of a standard network session connection to the requesting application program 42 or operating system 34 component. The virtual context component 48 interoperates with the balance of the virtual TOE device, as implemented in the VMKernel 18 as a corresponding virtual context component $50_{1-N}$, to establish a virtual connection path suitable to support the originally requested network session.

In the preferred embodiments of the present invention, the virtual content components 48 serve largely as a connection conduit to the corresponding virtual context components $50_{1-N}$ that, in turn, implement the driver functions of the virtual TOE devices. Specifically, the virtual context components $50_{1-N}$ are responsible for selecting and establishing a route to the TOE adapter $24_{1-X}$ capable of servicing a given session request. A hardware abstraction layer 52 operates as a function dispatch table to enable connections, through defined APIs, between the virtual context components $50_{1-N}$ and vendor-supplied TOE drivers $54_{1-X}$. Various circumstances exist where an initially diverted network session must be routed through a conventional NIC 22. In these circumstances, the applicable virtual context component $50_{1-N}$ operates to route the connection through a TCP/IP stack 56 (not shown) resident in the VMKernel 18 to effect a software-emulated TOE capable of transparently supporting the diverted network session.

Figure 2:
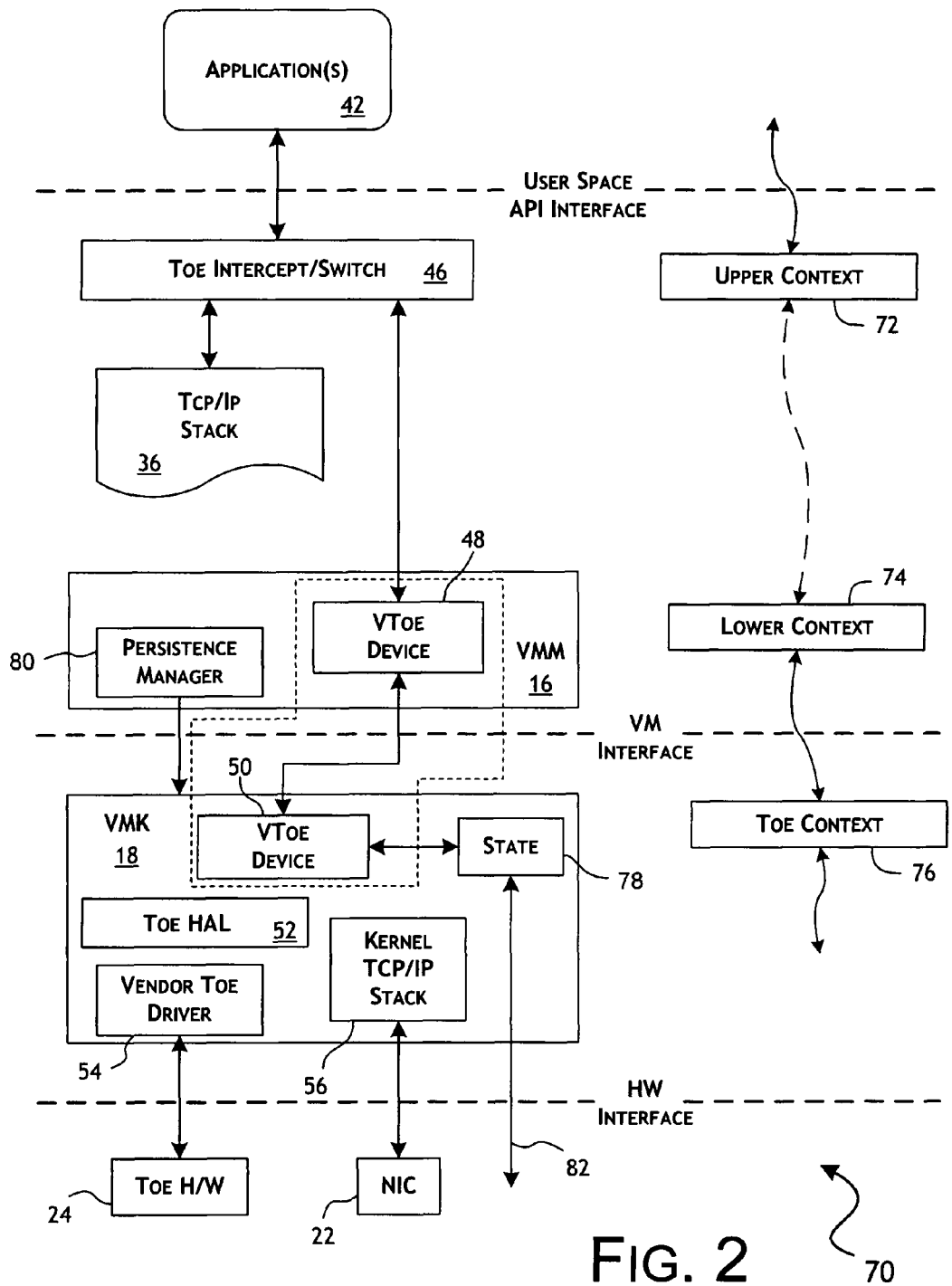
FIG. 2 is a detailed view of a preferred embodiment of the present invention illustrating the layered association between TOE virtualization components.

A detailed view 70 of the architecture 10 is provided in FIG. 2. As generally shown, the TOE intercept switch 46 operates to functionally implement one or more network call interfaces and divert selected network sessions, depending on management-determined criteria, to use a TOE accelerated network session path. In general, network sessions can be established in a number of different configurations, though typically configured to establish either a point-to-point communications path or to establish a listener open to receiving connections from any number of different clients. In both cases, a client or server application 42 initially requests, in conventional manner, creation of a socket through which to conduct the corresponding network session. Additional conventional calls to set desired socket optional parameters can and typically are then made. A bind or connect call is also made that provides a concrete IP specification and port request. Calls to listen and accept network connections further determine the particular behaviors implemented by the socket.

In accordance with the present invention, the virtual context component 48 receives and responds to the diverted application 42 provided socket calls consistent with the appearance of immediately establishing a network session. Configuration and routing information necessary to respond to the socket calls is preferably retrieved, as needed, from the local network stack 36. The socket call parameters asserted to define an application context for the requested network session are progressively accumulated in an internal context table 72, 74. These collected application context entries are preferably held until the corresponding network session is terminated.

The context table 72, 74 is preferably structured as an upper context table 72 that allows the applications 42 to call and query the parameters of a requested network connection as appropriate to support the conventional and expected behavior of a local network stack. The lower context table 74 functionally stores a mapped context and potentially multiple mapped contexts for each of the application context entries. A mapped or lower context entry is established when the parameters accumulated into an application or upper context can be sufficiently resolved to determine the required routing through and among the set of TOE adapters $24_{1-X}$ as ultimately necessary to establish the application requested network session. In the preferred embodiments of the present invention, each of the virtual context components 48 interoperates with their corresponding virtual context component $50_{1-N}$ to evaluate the currently available external routes supported by the TOE adapters $24_{1-X}$ and define an internal or virtual routing necessary to functionally connect the application context with an appropriate TOE adapter $24_{1-X}$. The resolved routing information is stored as part of the corresponding lower context 74 entry and applied in the routing of data packets to and from the socket connected application 42. Preferably, a lower context entry includes an IP specification, port number, and MAC address, thereby allowing the virtual context components 48 to map between the socket space of the individual guest computer systems $12_{1-N}$ and the socket space supported by the TOE adapters $24_{1-X}$ as needed to avoid conflicts in the separate and concurrent use of the TOE adapters $24_{1-X}$.

The context table 72, 74 is preferably shared with the virtual context components $50_{1-N}$. In the establishment of a virtual path, a virtual context component $50_{1-N}$ is provided with the IP specification for the requested network session. For purposes of the present invention, an IP specification is defined as an IP address, IP address range, or INADDR_ANY IP identifier. This requested IP specification is stored as an entry in a TOE context table 76 and used to determine the nature of the corresponding network session created by the TOE adapters $24_{1-X}$. Thus, for a given guest computer system $12_{1-N}$ that may be administratively associated with a subset of the TOE adapters $24_{1-X}$, a restricted IP specification, reflecting the subset selection, is defined for the lower context entry. The original IP specification for the requested network session is instead used in creating the TOE network sessions on the subset of included TOE adapters $24_{1-X}$. The virtual context component $50_{1-N}$ thereafter uses the contents of the TOE context table 76 to maintain the multiplexing of packet data paths to the subset selection of TOE adapters $24_{1-X}$.

The context table 72, 74 is also preferably shared with the virtual context components $50_{1-N}$ to support persistence of the current network session state of the guest computer systems $12_{1-N}$. A copy of the context table 72, 74 is preferably maintained in a state storage table 78. In response to periodic checkpoint events generated internally by the virtual machine monitors 16 or VMKernel 18, or in response to a suspend event signal provided from a persistence manager 80, resident internal to a virtual machine monitor 16, the contents of the state table 78 are transferred to persistent storage 82 provided by or through the hardware platform 20. In the preferred embodiment of the present invention, persistent storage 82 is a secure file on a local disk drive unit. On restoration of a checkpointed network session state, the TOE context 76 is reconstructed utilizing the context table 72, 74 data. To preserve the integrity of the context table 72, 74, diverted network sessions no longer routable through a TOE 24 are instead routed through the VMKernel 18 resident TCP/IP stack 56 to effect a software emulated TOE 24.

A preferred process of establishing a network session, in accordance with the present invention, is shown in FIG. 3. A conventional series of calls are made by an application program 42 to create 92 a communications session through a request-specified socket. The TOE intercept switch 46 determines the network interface and the related network parameters appropriate for use in creation of the network connection. The local stack 36 may be consulted 94 to determine an otherwise unused port value within the range assigned to the corresponding guest computer system $12_{1-N}$. Set socket option calls are asserted to configure 96 the communications session. A bind socket call is then made by the application program 42 to establish 98 the session.

When the bind socket call is received, sufficient information has been accumulated by the TOE device virtual context components 48, $50_{1-N}$ to resolve 100 a virtual connection to an appropriate TOE adapter $24_{1-X}$ determined from the network routes handled by the set of TOE adapter $24_{1-X}$ administratively assigned or bound to the network session requesting guest computer system $12_{1-N}$. Once the identity of the portal TOE adapter(s) $24_{1-X}$ is determined 100, the accumulated application context information is applied 102, preferably by replaying in order as socket calls to the participant portal TOE adapter or adapters $24_{1-X}$. A corresponding network endpoint will thereby be established 104 by the participating TOE adapters $24_{1-X}$. The network endpoint creation status is then returned 106 to the application program 42. The extension of the requested network endpoint through the virtual communications path created by the present invention to enable aggregate use of the set of TOE adapters $24_{1-X}$ is thus entirely transparent to the application programs 42.

The present invention also supports dynamic alteration of the virtual network communications paths, particularly in response to protocol parameter changes applied or enforced on any of the TOE adapters $24_{1-X}$. Where, for example, the IP address of a TOE adapter $24_{1-X}$ is established using the conventional dynamic host configuration protocol (DHCP), a new IP address may be dynamically assigned to a TOE adapter $24_{1-X}$ while the adapter is actively hosting one or more network sessions.

In response to a changed network protocol parameter that would affect the integrity of a virtual path, the present invention implements a dynamic virtual path reconfiguration process 110, as illustrated in FIG. 4A. Conventional network stacks natively implement a standard interface that provides notices of such changes. The network stacks 36, 38, 40 resident in the guest computer systems $12_{1-N}$ will report network protocol changes relative to the NICs 22, 22' configured to be visible to a corresponding guest computer system $12_{1-N}$. These notices are propagated to the TOE device virtual context components $50_{1-N}$ for evaluation. Where the network protocol parameter change affects an existing virtual network connection path, a determination 112 is made to reestablish the network session consistent with the changed protocol parameter. Where the changed parameter is the IP address assigned to a TOE adapter, which is the predominant case and generally illustrative, the lower mapping is re-resolved 114 to reflect the changed IP address. In the typical case, only the endpoint IP address defined for the network session needs to be changed. Provided the corresponding vendor TOE driver supports dynamic updating of the network session control blocks, the vendor TOE driver is directed 116 to implement the change. Normal use of the network session then continues.

In cases where the vendor TOE driver does not support dynamic changes to network session control blocks or a dynamic updating of any one or more of the changed protocol parameters, the process 130 shown in FIG. 4B is implemented. In connection with the re-resolving of the virtual network connection paths 132, the changes to the protocol parameters are incorporated into the virtual context table 72, 74 mapping. The affected network sessions are then closed and, based on the virtual context mapping table 72, 74, updated network sessions are established 134. Again, the operation of the present invention in adapting to protocol changes enforced on the TOE adapter $24_{1-X}$ maintains the aggregate use of the set of TOE adapters $24_{1-X}$ entirely transparent to the application programs 42.

Figure 5:
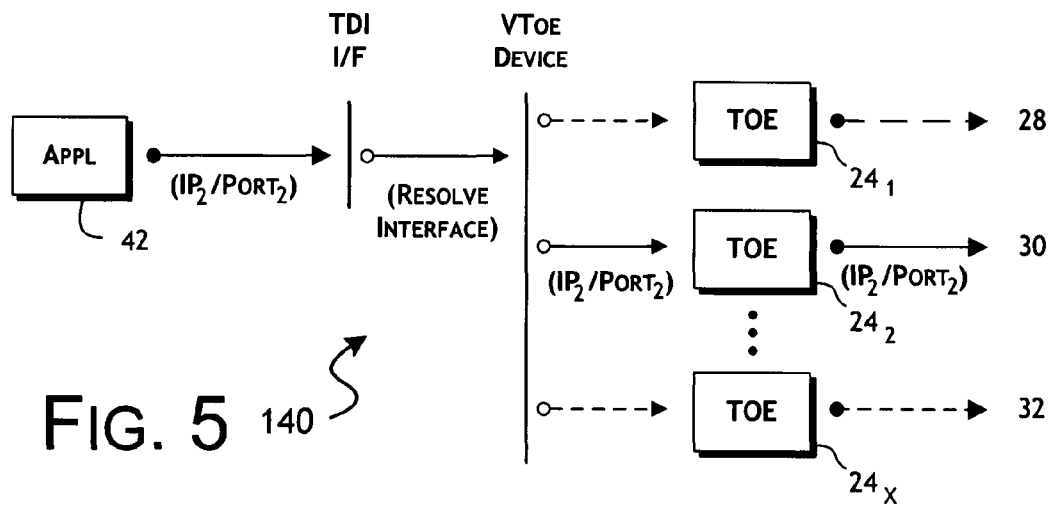
FIG. 5 illustrates the establishment of a virtual transport session linking an application program with a TOE adapter as implemented in a preferred embodiment of the present invention.

FIG. 5 illustrates the establishment 140 of a virtual network connection path for a point-to-point network session in accordance with the present invention. The initial request to establish the network session defines the target IP address and port. The target port may be privileged or unprivileged. The port opened to the guest operating system $12_{1-N}$ may be any available unprivileged port where the application 42 is administratively assigned for diversion. Alternately, the opened port may be one in a range of unprivileged ports administratively assigned for diversion. The TOE device virtual context components 48, $50_{1-N}$ function to determine and apply a mapping that enables an internal, virtual re-targeting of the connection request. The connection request is internally targeted to any available unprivileged port of a TOE adapter $24_{1-X}$ that supports a route to the original target IP address. Where multiple TOE adapters $24_{1-X}$ support a usable target IP route, the virtual TOE components 48, $50_{1-N}$ elect one as the virtual target. Conventional techniques can then be used for locating an acceptable unprivileged port for use as the virtual target port. When the TOE adapter $24_{1-X}$ and port are identified, the mapping is completed and the network session is created on the identified TOE adapter $24_{1-X}$ using the application context to provide the target IP address and port.

Figure 6:
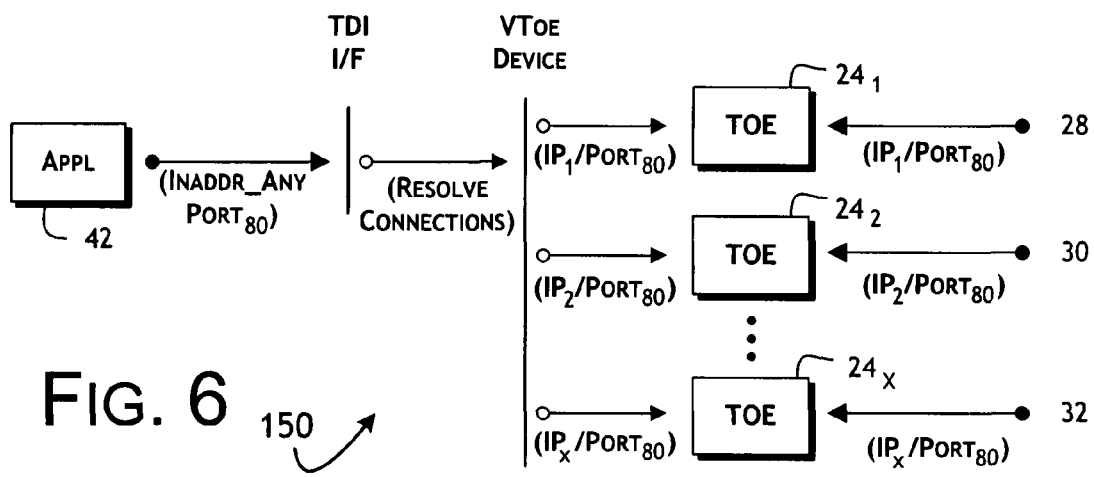
FIG. 6 illustrates the establishment of a virtual transport session allowing a listener to function through multiple TOE adapters as supported by a preferred embodiment of the present invention.

Establishment of a multiplexed virtual network connection path 150 is shown in FIG. 6. Typically, an application program 42, to operate as a server, will open a local privileged port for listening with a target IP specification of INADDR_ANY. For example, the application program 42 may operate as a HTTP server on privileged port 80. In accordance with the present invention, the TOE device virtual context component 48, $50_{1-N}$ supporting the virtual machine $12_X$ containing the application program 42 creates multiplexed virtual connection paths to the service participating TOE adapters $24_{1-X}$; that is, to the TOE adapters $24_{1-X}$ assigned or otherwise accessible by the virtual machine $12_X$. In creating these paths, the TOE device virtual context component 48, $50_{1-N}$ resolves and establishes the individual paths using the IP address assigned to the individual participating TOE adapters $24_{1-X}$. Map entries are created in the context table 72, 74 identifying each of the participating TOE adapters $24_{1-X}$, the IP address of the virtual machine $12_X$ hosting the application program 42, and the port number of the opened local privileged port. Each of the participating TOE adapters $24_{1-X}$ is then directed to listen for network sessions requests on each of the privileged port instances. Where the port is already open on any of the participating TOE adapters $24_{1-X}$, the port is opened in a shared mode. An external client access through any of the networks connected to the participating TOE adapters $24_{1-X}$ is then effectively routed over a branch of the multiplexed virtual paths to the server application 42. The client access appears as an ordinary network connection on the local privileged port.

Figures 7, 8:
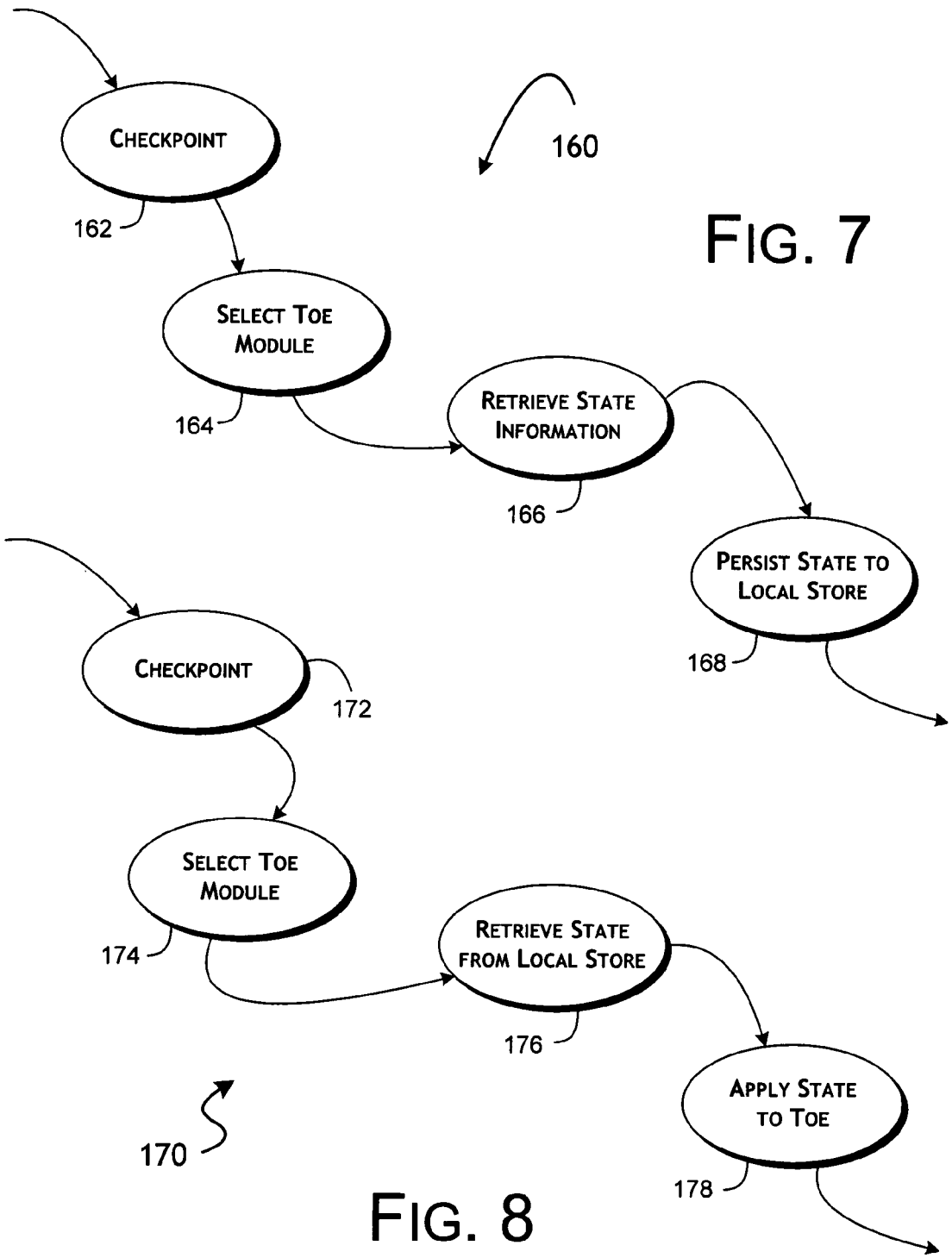
FIG. 7 is a flow diagram illustrating the process of checkpointing the virtual connection state associated with a TOE adapter.
FIG. 8 is a flow diagram illustrating the process of restoring the check pointed network session state to a TOE adapter.

A preferred embodiment of the present invention enables transportability of network sessions through a process of persistently storing and restoring the mappings contained in the context tables 72, 74. A advantageous feature of virtual computer systems is the ability to suspend and restore the working state of individual guest computer systems $12_{1-N}$. The present invention allows the state of a guest computer system $12_{1-N}$, specifically in regard to network sessions, to be suspended even in the presence of active network sessions. As indicated in FIG. 7, the current state of a guest computer system $12_{1-N}$ is preferably checkpointed 162 periodically and in response to the operation of the persistence manager 80. When a checkpoint 162 occurs, the virtual TOE components 48, $50_{1-N}$ interoperate 164 to update 166 the state store 78 and then persist the mapping 168 information.

On a restore 170 from a suspended state, as shown in FIG. 8, at a checkpoint 172 defining a consistent system state pending the reactivation of a suspended a guest computer system $12_{1-N}$, the corresponding virtual TOE components 48, $50_{1-N}$ are selected 174, and the context table 72, 74 mapping information retrieved 176. Each of the network sessions identified by an application context in the context table 72, 74 mappings is then reestablished 178. Since the application contexts include the complete set of socket configuration calls and related parameter data, new corresponding virtual connection paths appropriate to the then current set of TOE adapter $24_{1-X}$ can be resolved and established, with the result that the full state of the network sessions can be restored transparent to the applications 42.

The restore 170 from a suspended state may occur following a transfer and hosting of a guest computer systems $12_{1-N}$ by a different hardware platform 20. In this case, there is no assurance that the various network sessions can be reestablished utilizing the same or directly equivalent NICs 22 and TOE adapters $24_{1-X}$. Preferably, the application contexts are further used to store identifications of the network session types. A network session previously using NIC 22 will be reestablished, depending on network routing requirements, through a NIC 22, 22' on the new hardware platform 20. Network sessions previously utilizing the TOE adapters $24_{1-X}$ will be reestablished directly through TOE adapters $24_{1-X}$ on the new hardware platform 20 or through software emulated TOE adapters using the kernel TCP/IP stack 56 and a routing appropriate NIC 22.

Thus, a system and methods for enabling the separate and aggregate use of TOE adapters in the context of a virtual computer system have been described. In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

What is claimed is:

1. A virtual computer system implementing architectural support for the use of one or more TCP/IP offload engines (TOE) by the guest computer systems hosted on the virtual computer system, each of the guest computer systems including a guest operating system and each guest operating system including a network stack, said virtual computer system comprising:

a) a host platform including a central processing unit, system memory, a plurality of network interface controllers (NICs), and a plurality of TOEs, wherein said plurality of NICs and said plurality of TOEs is coupleable to one or more physical communications network links;

b) a plurality of guest computer system components wherein each guest computer system component includes an offload selection switch provided in the corresponding guest operating system and a first virtual context component, wherein each offload selection switch selectively establishes network connections for applications in each corresponding guest computer system with the corresponding first virtual context component or the network stack; and c) a virtual computer system kernel including a plurality of second virtual context components having a first defined correspondence with said first virtual context components, a network hardware abstraction layer, and a plurality of TOE drivers having a second defined correspondence with said plurality of TOEs, each second virtual context component defined to select and establish a route to a TOE driver for servicing a request for a communications session, wherein a virtual TOE device is implemented as a pair of one of the first virtual context components and one of the second virtual context components, wherein said first and second virtual context components interoperate to maintain virtual associations of the communications sessions established through said first and second virtual context components, wherein said virtual associations include requested and resolved associations and where said requested and resolved associations include the ports and IP addresses that define the communications session.

2. The virtual computer system of claim 1 further including a persistent state store coupled to said virtual computer system kernel, wherein said persistent state store provides for the storage of a predetermined set of virtual associations.

3. The virtual computer system of claim 1 wherein said first and second virtual context components interoperate to alter existent virtual associations in response to a changed network protocol parameter of the corresponding communications session, whereby established network sessions can be maintained transparently to participating application programs.

4. The virtual computer system of claim 3 wherein said first virtual context components support deferred binding of network session connections relative to application programs and recording of the option configurations requested by application programs in establishing network session connections, said first virtual context components interoperating with said second virtual context components to resolve and establish network session connections, said first virtual context components being operative to replay the option configuration requests for a predetermined network communication session once the network session connection is resolved.

5. The virtual computer system of claim 4 wherein first and second virtual context components interoperate to define a bound socket connection between a socket supported by said first virtual context component and a socket supported by at least one TOE of said plurality of TOEs.

6. The virtual computer system of claim 5 wherein said second virtual context components provide for the selection and establishment of a socket connection with a dynamically selected TOE of said plurality of TOEs, where in the dynamic selection is dependent on the current network parameters of each TOE of said plurality of TOEs.

7. The virtual computer system of claim 6 wherein said second virtual context components are responsive to alterations in the current network parameters of each of said plurality of TOEs, wherein said second virtual context components selectively redefine bound socket connections between sockets supported by said first virtual context component and sockets supported by a dynamically selected TOE of said plurality of TOEs.

8. The virtual computer system of claim 7 further including a state store coupled to said virtual computer system kernel, wherein said state store provides for the storage of a predetermined set of virtual associations, and wherein said first virtual context component selectively provides for the redetermination of said bound socket connection between said socket supported by said first virtual context component and another socket supported by at least one TOE of said plurality of TOEs based on said requested associations stored by said state store.

9. The virtual computer system of claim 8 wherein said state store includes a persistent state store.

10. A method of enabling shared use of one or more TCP/IP offload engines (TOE) by a plurality of guest computer systems hosted on a virtual computer system, each of the guest computer systems including a guest operating system and each guest operating system including a network stack, said method comprising the steps of:
providing an offload selection switch and a first component layer in each of the plurality of guest computer systems hosted on the virtual computer system, wherein each offload selection switch selectively establishes network connections for applications in each guest computer system with the corresponding first component layer or the network stack;
providing a second component layer on said virtual computer system, wherein an instance of said second component layer is associated with a TOE driver linked to a corresponding TOE coupled to said virtual computer system; and
wherein said first component layers receive information sets defining requested sessions;
wherein, for a given requested session, the corresponding first component layer communicates with a selected one of said second component layers to determine for said given requested session a virtual session; and
wherein said selected second component layer communicates through an associated TOE driver to establish a network session conforming to said virtual session.

11. The method of claim 10 further comprising the steps of:
a) storing said information sets defining requests sessions; and
b) selectively using said information sets internal to said first and second component layers to reselect one of said second component layers as said selected one of said second component layers and redetermine said virtual session for said given requested session, wherein said selected second component layer communicates through said associated TOE driver to establish a network session conforming to said virtual session.

12. The method of claim 11 further comprising the steps of:
a) receiving, by said first component layers, notice of changes to predetermined network parameters maintained by said TCP/IP offload engines; and
b) initiating, selectively in response to a notice of a predetermined change in said predetermined network parameters, said step of selectively using.

13. The method of claim 12 further comprising the step of persistently storing the information sets corresponding to said requested sessions.

14. The method of claim 12 wherein said information sets include the applicable port, IP, and MAC addresses defining the requested network session.

15. The method of claim 14 wherein said information sets further include control parameters used to define the operation of the requested network session.

16. The method of claim 15 wherein said step of selectively using includes re-application of the control parameters in the establishment of the requested network session.

17. A virtual computer system enabling aggregated use of one or more TCP/IP offload engines (TOE) by a plurality of guest computer systems hosted on the virtual computer system, each of the guest computer systems including a guest operating system and each guest operating system including a network stack, said virtual computer system comprising:
a) a host platform including a central processing unit, system memory, a plurality of network interface controllers (NICs), and a plurality of TOEs, wherein said plurality of NICs and said plurality of TOEs is coupleable to one or more physical communications network links;

b) a plurality of guest computer system components wherein each guest computer system component includes an offload selection switch provided in the corresponding guest operating system;

c) a plurality of virtual machine monitors coupled respectively to said plurality of guest computer system components, each of said plurality of virtual machine monitors including a first virtual context component coupled to a respective one of said offload selection switches to selectively establish network connections for applications in the corresponding guest computer system with the corresponding first virtual context component or the network stack, wherein said first virtual context components maintain a mapping between application network request contexts specific to corresponding ones of said plurality of guest computer system components and virtual network request contexts corresponding to said plurality of TOEs; and d) a virtual computer system kernel including a plurality of network stacks and TOE engine drivers coupled respectively to said plurality of TOEs, a plurality of second virtual context components having a defined correspondence with said plurality of TOEs, wherein said plurality of second virtual context components is coupled to and interoperative with said plurality of virtual machine monitors to determine said mapping.

18. The virtual computer system of claim 17 wherein said mapping includes, for a given network session request, a given request defined port number, IP address specification, and MAC address, as received by a corresponding one of said offload selection switches, and a resolved port number, IP address specification, and MAC address, as determined by a corresponding one of said first virtual context components and a predetermined one of said second virtual context components.

19. The virtual computer system of claim 18 wherein said first virtual context components are responsive to predetermined network protocol parameters maintained by said plurality of network stacks and wherein said first virtual context components select said second virtual context components for interoperation in defining said mapping based on said predetermined network protocol parameters.

20. The virtual computer system of claim 19 wherein said first virtual context components are dynamically responsive to changes in said predetermined network protocol parameters to reselect, for said given network session request, a corresponding one of said second virtual context components and redetermine said resolved port number, IP address specification and MAC address.

21. A virtual computer system implementing architectural support for the use of one or more TCP/IP offload engines (TOE) by the guest computer systems hosted on the virtual computer system, each of the guest computer systems including a guest operating system and each guest operating system including a network stack, said virtual computer system comprising:

a) a host platform including a plurality of network interface controllers (NICs) and a plurality of TOE engines, wherein said plurality of NICs and said plurality of TOEs is coupleable to one or more physical communications network links;

b) a plurality of guest computer system components wherein each guest computer system component includes an offload selection switch provided in the corresponding guest operating system and a first virtual context component, wherein each offload selection switch selectively establishes network connections for applications in each corresponding guest computer system with the corresponding first virtual context component or the network stack; and c) a virtual computer system kernel including a plurality of second virtual context components and a plurality of TOE drivers in communication with said plurality of TOEs, each second virtual context component defined to select and establish a route to a TOE driver for servicing a request for a communications session, wherein a virtual TOE device is implemented as a pair of one of the first virtual context components and one of the second virtual context components.

* * * * *